(12) United States Patent
Benjamin et al.

(10) Patent No.: US 8,882,425 B2
(45) Date of Patent: Nov. 11, 2014

(54) THREAD LOAD DISTRIBUTION

(75) Inventors: Daniel Benjamin, Simsbury, CT (US); Kaliya Balamurugan, Newington, CT (US); Daniel R. Kapszukiewicz, Plainfield, CT (US)

(73) Assignee: United Technologies Corporation, Hartford, CT (US)

( * ) Notice: Subject to any disclaimer, the term of this patent is extended or adjusted under 35 U.S.C. 154(b) by 165 days.

(21) Appl. No.: 13/437,112

(22) Filed: Apr. 2, 2012

(65) Prior Publication Data
US 2013/0259599 A1 Oct. 3, 2013

(51) Int. Cl.
*F16B 33/00* (2006.01)

(52) U.S. Cl.
USPC ........................................ 411/366.1; 411/116

(58) Field of Classification Search
USPC ............... 411/366.1, 263–265, 309, 310, 938
IPC ........................................................ F16B 33/00
See application file for complete search history.

(56) References Cited

U.S. PATENT DOCUMENTS

| | | | | |
|---|---|---|---|---|
| 1,870,380 | A | * | 8/1932 | Peters et al. ................... 411/308 |
| 2,349,651 | A | | 5/1944 | Davis |
| 2,772,102 | A | * | 11/1956 | Webb ............................ 285/334 |
| 3,205,756 | A | * | 9/1965 | Ollis, Jr et al. ................ 411/411 |
| 3,266,363 | A | | 8/1966 | Bronson et al. |
| 4,549,754 | A | * | 10/1985 | Saunders et al. .............. 285/334 |
| 5,123,793 | A | * | 6/1992 | Bonstein ....................... 411/310 |
| 5,537,814 | A | | 7/1996 | Nastuk et al. |
| 5,779,416 | A | | 7/1998 | Sternitzky |
| 5,782,078 | A | | 7/1998 | Brantley |
| 6,381,827 | B1 | | 5/2002 | Steinbock |
| 6,848,724 | B2 | | 2/2005 | Kessler |
| 7,731,466 | B2 | | 6/2010 | Shea et al. |
| 7,761,991 | B2 | | 7/2010 | Walter et al. |
| 7,997,842 | B2 | * | 8/2011 | Diekmeyer ................ 411/366.1 |
| 2010/0329776 | A1 | | 12/2010 | Durling |
| 2011/0146298 | A1 | | 6/2011 | Reinhardt et al. |

FOREIGN PATENT DOCUMENTS

EP 0503964 9/1992
EP 1591623 11/2005

OTHER PUBLICATIONS

International Search Report and Written Opinion for International Application No. PCT/US2013/033973 completed on Jan. 15, 2014.

* cited by examiner

*Primary Examiner* — Gary Estremsky
(74) *Attorney, Agent, or Firm* — Carlson, Gaskey & Olds, P.C.

(57) ABSTRACT

A fastener arrangement includes a threaded member having threads extending from a first end to a second end. The threads have a thread contour provided by a load and clearance flank surfaces joined to one another by a crest and root. For the external threaded member the crest provides a crest diameter, and a root provides a root diameter and is arranged between adjoining threads. At least one thread near the first end has a weakened thread contour that decreases rigidity of the one thread compared to other threads, enabling axial loads to be distributed more evenly between the threads.

7 Claims, 2 Drawing Sheets

US 8,882,425 B2

THREAD LOAD DISTRIBUTION

BACKGROUND

This disclosure relates to a gas turbine engine including, for example, compressor and turbine rotors assembled using a tie shaft connection.

Gas turbine engines include a compressor that compresses air and delivers it downstream to a combustion section. The air is mixed with fuel in the combustion section and combusted. Products of this combustion pass downstream over turbine rotors, causing the turbine rotors to rotate.

In one example arrangement, the compressor section is provided with a plurality of rotor stages, or rotor sections, arranged in a stack. Traditionally, these stages have been joined sequentially, one to another, into an inseparable assembly by welding, or into a separable assembly by bolting using bolt flanges, or other structure to receive the attachment bolts. Another joining approach uses a tie shaft and threaded member that cooperate with one another to clamp the rotor sections to one another.

The threaded member has a tendency to lift off of, or flare outward from, the tie shaft. This typically occurs at the base of the threaded member near where the axial load is applied to the stack. Lift off is due to the uneven axial loading of the threads. One solution has been to use a differing thread pitch between the tie shaft and the threaded member to achieve more even thread loading.

SUMMARY

A fastener arrangement according to an exemplary aspect of the present disclosure includes, among other things, a first threaded member extending from a first end to a second end. The threads have a thread contour provided by load and clearance flank surfaces joined to one another by crests and roots. The crest provides a crest diameter, and a root provides a root diameter and is arranged between adjoining threads. At least one thread near the first end has a weakened thread contour decreasing rigidity of the one thread compared to other threads.

In a further non-limiting embodiment of the foregoing fastener arrangement, the first threaded member provides external threads and the second threaded member provides internal threads.

In a further non-limiting embodiment of either of the foregoing fastener arrangements, the first threaded member is a shaft that provides external threads and wherein the second threaded member is one of a hub or a nut that provides the internal threads.

In a further non-limiting embodiment of any of the foregoing fastener arrangements, the second threaded member's threads provide first and second threaded portions, the root diameter of the first threaded portion is constant, and the root diameter of the second threaded portion increases in a direction away from the first threaded portion.

In a further non-limiting embodiment of any of the foregoing fastener arrangements, the second threaded member's threads have a constant crest diameter.

In a further non-limiting embodiment of any of the foregoing fastener arrangements, the second threaded member's second threaded portion includes root depths that taper at a root angle.

In a further non-limiting embodiment of any of the foregoing fastener arrangements, the root angle is approximately 3 degrees.

In a further non-limiting embodiment of any of the foregoing fastener arrangements, the crests of the second threaded portion decrease toward the second end.

In a further non-limiting embodiment of any of the foregoing fastener arrangements, the threads include a constant pitch.

In a further non-limiting embodiment of any of the foregoing fastener arrangements, the fastener arrangement may include a second threaded member secured to the first threaded member, and the second threaded member has the same pitch as the first threaded member.

In a further non-limiting embodiment of any of the foregoing fastener arrangements, the threads extend along an axis, the load flank surfaces are inclined about the normal to an axis of the first threaded member, and the clearance flank surfaces are generally parallel to one another. The second threaded member has load flank surfaces engaging the corresponding load flank surfaces of the mating first threaded member.

In a further non-limiting embodiment of any of the foregoing fastener arrangements, the threads extend along an axis, and the second threaded member's crest diameter varies and lies along crest angle relative to the axis. The crests are arranged on the crest angle.

In a further non-limiting embodiment of any of the foregoing fastener arrangements, the fastener arrangement may include a second threaded member having load flank surfaces engaging the load flank surfaces of the first threaded member at thread contact interfaces. The thread contact interfaces are smaller at the second end than other thread contact interfaces.

In a further non-limiting embodiment of any of the foregoing fastener arrangements, the second threaded member's root diameter is constant and the threaded members include the same pitches that are constant.

BRIEF DESCRIPTION OF THE DRAWINGS

The disclosure can be further understood by reference to the following detailed description when considered in connection with the accompanying drawings wherein.

DETAILED DESCRIPTION

Figure 1:
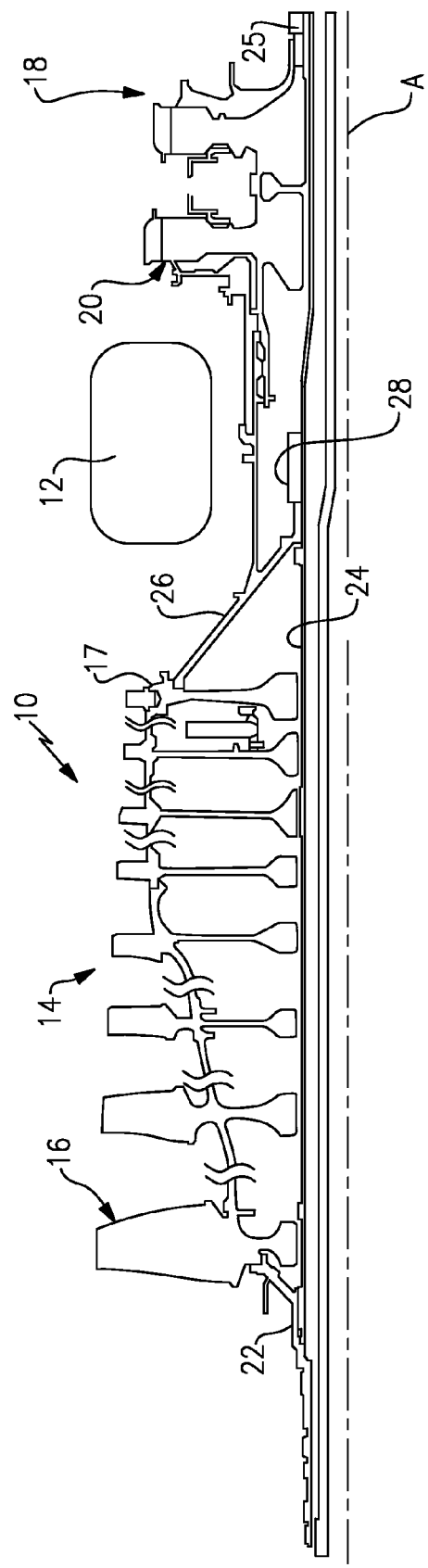
FIG. 1 is a cross-sectional view of a portion of an example gas turbine engine having a tie shaft.

FIG. 1 schematically shows an exemplary section of a gas turbine engine 10, in particular a high pressure spool, incorporating a combustion section 12, shown schematically. A compressor section 14 includes multiple compressor rotors 16 arranged to provide a compressor stack. A turbine section 18 has multiple turbine rotors 20 providing a turbine stack. The compressor and turbine rotors 16, 20 respectively support airfoils that are either integral or separately attached. As shown, an upstream hub 22 has a threaded engagement with a tie shaft 24 upstream of the compressor rotors 16. There may be a low pressure compressor and a fan section to the left (or upstream) of the upstream hub 22 in the orientation illustrated.

An upstream hub 22 is positioned at the upstream end of the compressor stack, while a downstream hub 26 is positioned at a downstream side of the compressor stack, and engages a downstream-most compressor rotor 17. The stack of compressor rotors is thus sandwiched between the upstream and downstream hubs 22, 26, clamped by tie shaft 24 and secured by a mid nut, or mid abutment member, 28. Downstream hub 26 abuts the turbine stack in the example shown. The turbine stack is sandwiched between the downstream hub 26 and a turbine nut 25. The upstream hub 22 and nuts have internal threads that cooperate with external threads provided on the tie shaft 24.

It is desirable to evenly distribute the axial load on the threads to reduce stress on the threads and prevent lift off. To this end, a fastener arrangement is provided with threads, some of which include a weakened thread contour that decreases rigidity of at least one thread compared to other threads thereby enabling axial loads to be distributed more evenly between the threads.

Figure 2:
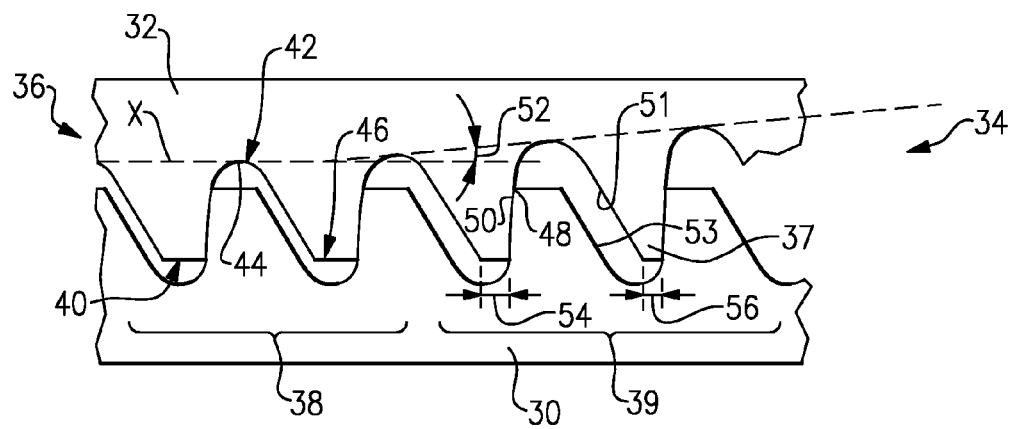
FIG. 2 is a schematic illustration of one arrangement of first and second threaded members that promote relatively uniform thread loading.

One example fastener arrangement for the threaded tie shaft interfaces is illustrated in FIG. 2. Load and clearance flank orientation is dependent on the direction of the load and can be a minor image of the one shown. The fastener arrangement includes first and second threaded members 30, 32. In one example, the first threaded member 30 is male, and the second threaded member 32 is female. The second threaded member 32 has the same pitch as the first threaded member 30 in one example. The second threaded member 32 includes threads that extend in an axial direction X between first and second ends 34, 36.

The second threaded member 32 has a thread contour provided by a load flank surface 48 and clearance flank surface 51 joined to one another by a crest 46 and root 44. The first threaded member 30 has threads with load flank surfaces 50 that engage the load flank surfaces 48 of the second threaded member 32. In the example, the load flank surfaces 48, 50 are inclined about the normal to the axis X, and the clearance flank surfaces 51, 53 are generally parallel to one another. The threads at the first end 36 see the greatest share of the total axial load along the contact on the mating load flanks 48, 50, and the following threads between first and second ends 34, 36 will see progressively a lesser share of the total axial load.

The crest 46 of the second threaded member provides a minor diameter 40, which is generically referred to as a "crest diameter." A root 44 provides a major diameter 42, which is generically referred to as a "root diameter," and is arranged between adjoining threads. At least one thread near the first end 34 has a weakened thread contour that decreases rigidity of the one thread compared to the first thread, enabling axial loads to be transferred to the following threads thus distributing the axial load more evenly between the threads.

The threads of the second threaded member 32 provide first and second portions 38, 39 that are distinct from one another. The threads have a constant minor diameter 40. The major diameter 42 of the first portion 38 is constant. The major diameter of the second portion 39 increases in a direction away from the first portion 38 towards the first end 34. Furthermore, the gap between clearance flank surfaces 51 of the first and second threaded members 30, 32 increases towards the first end 34. The second threaded portion 39 includes root depths that increase and taper at a root angle 52, which is approximately 3 degrees, for example. During manufacture, the cutting tool that forms the threads is advanced radially at a constant rate along the second threaded portion 39 to increase the root depths. Since the root depths increase and the pitch is constant, the crests 54, 56 of the second threaded portion 39 decrease toward the second end 34. That is, the crest 56 is smaller than the crest 54. The varying major diameter provides increasingly thinner teeth that are weaker and more flexible thereby imparting higher stresses on the threads closer to second end 34 while decreasing the stress on threads at the first end 36 which typically have the highest stress.

Figure 3:
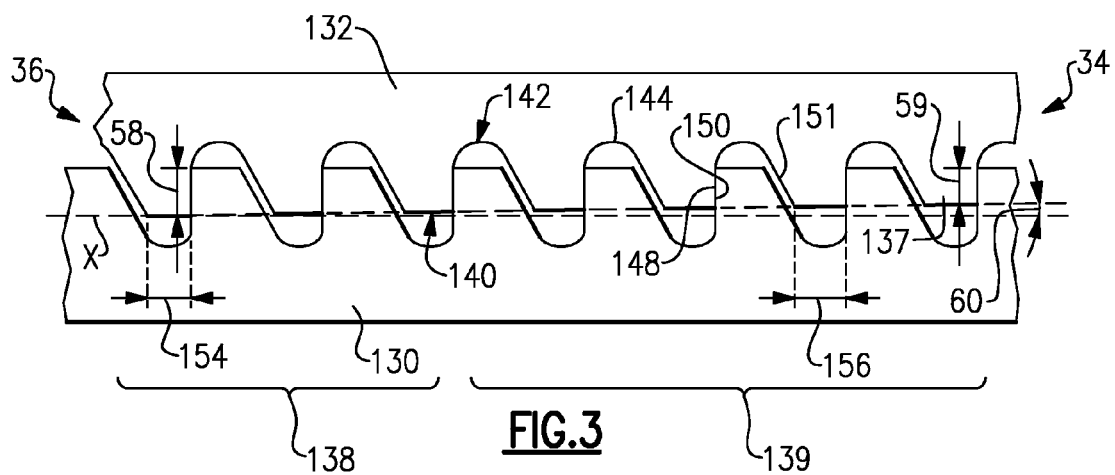
FIG. 3 is a schematic illustration of another arrangement of first and second threaded members that promote relatively uniform thread loading.

Referring to FIG. 3, the second threaded member's 132 threads extend along the axis X and include roots 144 and clearance flank surfaces 151. Load and clearance flank orientation is dependent on the direction of the load and can be a mirror image of the one shown. The second threaded member's minor diameter 140, or crest diameter, of the second member 132 is constant over first portion 138 and varies and lies along a crest angle 60 relative to the axis X over the second portion 139. The first threaded member's 130 crest and root diameters are parallel to axis X for the entire length of the joint. The crests 154, 156 of the second threaded member's threads are arranged on the crest angle 60. The first and second threaded members 130, 132 have load flank surfaces 148, 150 engaging one another at thread contact interfaces 58. The thread contact interfaces 59 become increasingly smaller at the second end 34 than other thread contact interfaces 58. As a result, the crests 154, 156 increase toward the second end 34. The crest 156 is larger than the crest 154. Progressively radially shorter threads are provided, which imparts higher stresses on the threads closer to second end 34 while decreasing the stress on threads at the first end 36, enabling axial loads to be distributed more evenly between the threads.

The second threaded member's major diameter 142, or root diameter, is constant, and the first and second threaded members 130, 132 include the same pitches, which are constant. During manufacture, the cutting tool for the second threaded member's 132 root diameter is advanced radially at a constant rate, for example, to create the crest angle 60, although other machining strategies may be used.

Although an example embodiment has been disclosed, a worker of ordinary skill in this art would recognize that certain modifications would come within the scope of the claims. For example, the first and second threaded members can be used for applications other than tie shafts or gas turbine engines. The root and crest modifications discussed relative to the second member may also be used for the first member. The thread form can also be different from the buttress thread form shown in FIG. 2 and FIG. 3. For that and other reasons, the following claims should be studied to determine their true scope and content.

What is claimed is:

1. A fastener arrangement having first and second threaded members, the fastener arrangement comprising:
the first threaded member having threads extending from a first end to a second end, the threads having a thread contour provided by load and clearance flank surfaces joined to one another by crests and roots, the crest providing a crest diameter, and a root providing a root diameter and arranged between adjoining threads, wherein at least one thread near the first end has a weakened thread contour decreasing rigidity of the one thread compared to other threads, wherein the second threaded member's threads provide first and second threaded portions, the root diameter of the first threaded portion constant, and the root diameter of the second threaded portion increasing in a direction away from the first threaded portion.

2. The fastener arrangement according to claim 1, wherein the first threaded member provides external threads and the second threaded member provides internal threads.

3. The fastener arrangement according to claim 1, wherein the threads have a constant crest diameter.

4. The fastener arrangement according to claim 1, wherein the second threaded portion includes root depths that taper at a root angle.

5. The fastener arrangement according to claim 4, wherein the root angle is approximately 3 degrees.

6. The fastener arrangement according to claim 1, wherein the crests of the second threaded portion decrease toward the second end.

7. A fastener arrangement having first and second threaded members, the fastener arrangement comprising:

the first threaded member having threads extending from a first end to a second end, the threads having a thread contour provided by load and clearance flank surfaces joined to one another by crests and roots, the crest providing a crest diameter, and a root providing a root diameter and arranged between adjoining threads, wherein at least one thread near the first end has a weakened thread contour decreasing rigidity of the one thread compared to other threads, wherein the threads extend along an axis, and the crest diameter of the second threaded member varies and lies along crest angle relative to the axis, comprising a second threaded member having load flank surfaces engaging the load flank surfaces of the first threaded member at thread contact interfaces, the thread contact interfaces smaller towards the second end, wherein the root diameter of the second threaded member is constant and the threaded members include the same pitches that are constant.

\* \* \* \* \*